(12) United States Patent
Marek

(10) Patent No.: US 6,818,136 B1
(45) Date of Patent: Nov. 16, 2004

(54) GROUNDWATER REMEDIATION SYSTEM

(75) Inventor: James C. Marek, Grimes, IA (US)

(73) Assignee: RSS LLC, West Des Moines, IA (US)

( * ) Notice: Subject to any disclaimer, the term of this patent is extended or adjusted under 35 U.S.C. 154(b) by 137 days.

(21) Appl. No.: 10/310,223

(22) Filed: Dec. 5, 2002

(51) Int. Cl.$^7$ .................................................. C02F 3/02
(52) U.S. Cl. ....................... 210/747; 210/749; 210/760; 210/220; 261/77
(58) Field of Search ................................ 210/747, 758, 210/760, 749, 610, 220; 261/77

(56) References Cited

U.S. PATENT DOCUMENTS

| | | | |
|---|---|---|---|
| 5,302,286 A | * | 4/1994 | Semprini et al. ........... 210/610 |
| 5,341,877 A | | 8/1994 | Abdul et al. |
| 5,622,450 A | | 4/1997 | Grant, Jr. |
| 5,623,992 A | | 4/1997 | Shaw |
| 5,688,076 A | | 11/1997 | Atkins |
| 5,846,434 A | | 12/1998 | Seaman et al. |
| 5,860,767 A | | 1/1999 | Atkins |
| 5,879,108 A | | 3/1999 | Haddad |
| 5,906,241 A | | 5/1999 | Pehlivan et al. |
| 6,048,134 A | | 4/2000 | Mancini et al. |
| 6,099,206 A | | 8/2000 | Pennell |
| 6,158,924 A | | 12/2000 | Athens et al. |
| 6,254,310 B1 | | 7/2001 | Suthersan |
| 6,332,972 B1 | | 12/2001 | Orolin et al. |

* cited by examiner

Primary Examiner—Robert A. Hopkins
(74) Attorney, Agent, or Firm—Sturm & Fix LLP

(57) ABSTRACT

A process where gas bubbles are produced under a partial vacuum and are dynamically agitated creating a vortex that allows for homogenization of the gas desired for dissolution into the affected aquifer. The technology is applied through installation of the apparatus into treatment wells. The treatment wells are installed as stand-alone wells where hydrogeological conditions are conductive, i.e. sandy aquifers, fractured bedrock aquifers, or in treatment cells where hydrogeological conditions are less conductive, i.e. saturated sediments that are clay rich. The system does not use a compressed gas, compressed air source, or forced air/gas through the use of compressors or blowers. Rather, it uses cavitation to produce a slight vacuum to draw gas or air through a snorkel apparatus that is attached to the gas mixing chamber of the unit. The unit is installed so that it is submerged in the treatment well below the water table. The gas is expelled under a slight vacuum from the base of the unit through a perforated base plate. A turbine is turned at a high rate of rotations per minute below the perforated plate, and causes the cavitation and vortex dynamics. This produces very small gas bubbles resulting in large gas surface exposure to the groundwater being treated. The gas bubbles experience a long retention time due to their small size and from the vortex produced by the system, which keeps the bubbles in suspension. The vortex dynamics provides a constant and consistent flux of dissolved gas to the aquifer. This translates to an efficient, energy saving system that conserves the amount of gas needed to produce the dissolved gas levels desired.

13 Claims, 2 Drawing Sheets

US 6,818,136 B1

GROUNDWATER REMEDIATION SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of groundwater remediation systems, and more particularly, to a method and apparatus for treatment of contaminated groundwater.

2. Description of Related Art

As can be seen by reference to the following U.S. Pat. Nos. 5,341,877, 5,622,450, 5,623,992, 5,688,076, 5,846,434, 5,860,767, 5,879,108, 5,906,241, 6,048,134, 6,099,206, 6,158,924, 6,254,310 and 6,332,972, the prior art is replete with myriad and diverse treatment systems for contaminated soils and groundwater.

Methods are known for the treatment of groundwater that has been contaminated with volatile and semi-volatile compounds such as chemicals associated with fuels, solvents, coal tar wastes, and other hazardous materials that have been released and have leached into the subsurface of the earth. Compounds such as benzene, toluene, ethylbenzene, xylenes, methyl tertiary butyl ether, poly-nuclear aromatics (PAHs), vinyl chloride, dichloroethene (DCE), trichloroethene (TCE), tetrachloroethene (PCE), carbon tetra-chloride, and other groundwater contaminants can be remediated through aerobic and/or anaerobic degradation, or through oxidation with ozone gas. Current technologies use compressed or forced gas injection to remove contaminants physically by volatilization, chemically by oxidation, or biologically by enhancing the natural attenuation process for these contaminants. These current technologies include air or gas sparging, oxygen release compounds, and chemical injection. Additional control measures to address hydraulic mounding, lateral migration of the contaminants, and volatilization of the contaminants are among the requirements and drawbacks inherent in the current technologies used.

While all of the aforementioned prior art systems have some beneficial features, they are uniformly deficient with respect to their failure to provide a simple, efficient, and practical method and apparatus for treating contaminated groundwater that minimizes detrimental side effects.

As a consequence of the foregoing situation, there has existed a longstanding need for a new and improved method and apparatus for treatment of contaminated groundwater and the provision of such a system is stated objective of the present invention.

BRIEF SUMMARY OF THE INVENTION

Briefly stated, the present invention provides a process where gas bubbles are produced under a partial vacuum and are dynamically agitated creating a vortex that allows for homogenization of the gas desired for dissolution into the affected aquifer. The technology is applied through installation of the apparatus into treatment wells. The treatment wells are installed as stand-alone wells where hydrogeological conditions are conductive; i.e., sandy aquifers, fractured bedrock aquifers, and/or in treatment cells where hydrogeological conditions are less conductive; i.e., saturated sediments that are clay rich. The system does not use a compressed gas, compressed air source, or forced air/gas through the use of compressors or blowers. Rather, it uses cavitation to produce a slight vacuum to draw gas or air through a snorkel apparatus that is attached to the gas mixing chamber of the unit. The unit is installed so that it is submerged in the treatment well, below the water table. The gas is expelled under a slight vacuum from the base of the unit through a perforated base plate. A turbine is turned at a high rate of rotations per minute below the perforated plate, and causes the cavitation and vortex dynamics. This produces very small gas bubbles resulting in large gas surface exposure to the groundwater being treated. The gas bubbles experience a long retention time due to their small size and from the vortex produced by the system, which keeps the bubbles in suspension. The vortex dynamics provides a constant and consistent flux of dissolved gas to the aquifer. This translates to an efficient, energy saving system that conserves the amount of gas needed to produce the dissolved gas levels desired.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
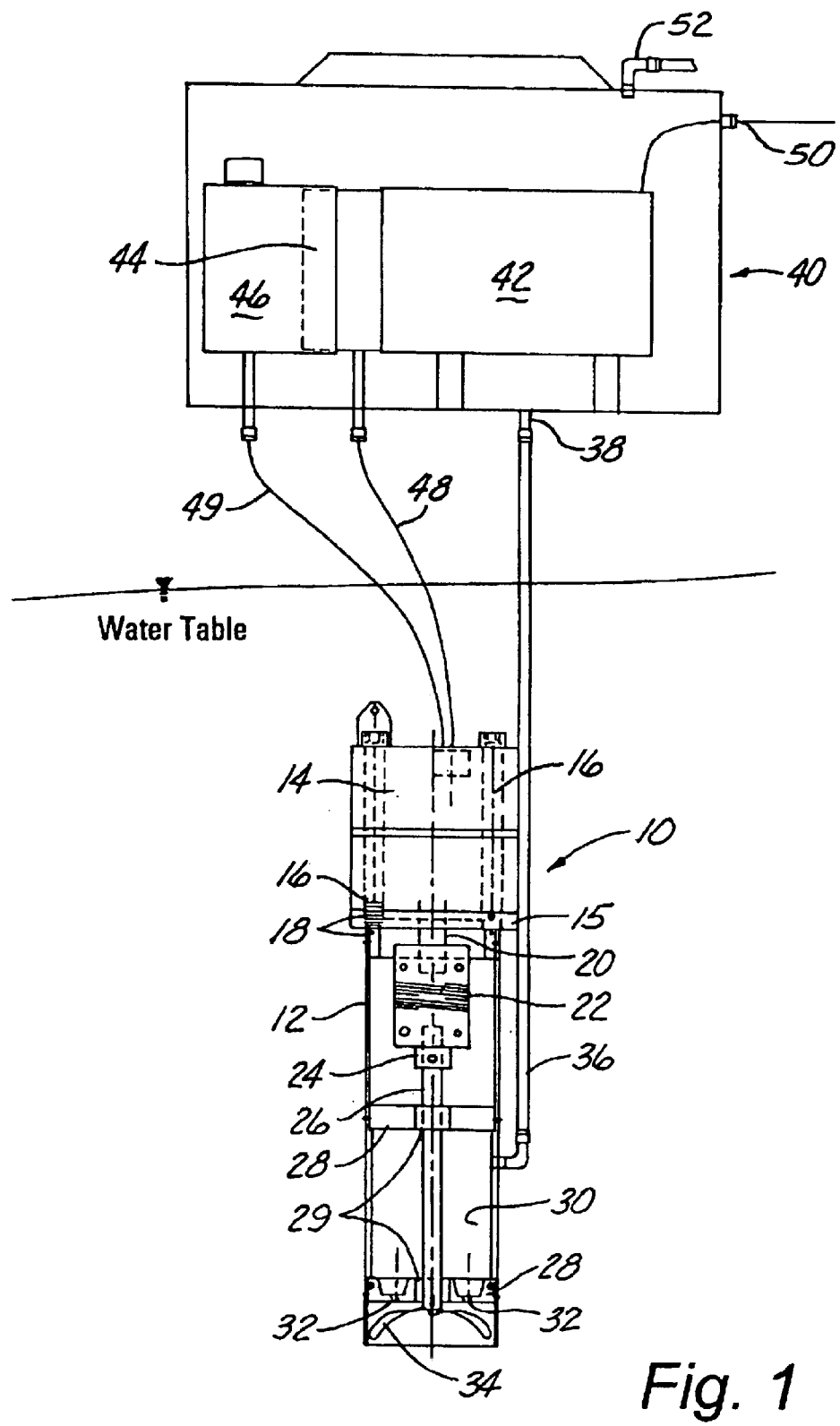
FIG. 1 is an enlarged side elevation sectional view showing the structure of the apparatus of the present invention.

As can be seen by reference to the drawings, and in particular to FIG. 1, the apparatus used in practicing the present invention is designated generally by the reference number 10. The apparatus 10 includes a stainless housing 12 with a hydraulic motor 14 attached to a connector plate 15 by bolts 16 and sealed with 'O' rings 18. The drive shaft 20 is connected by a solid or flex coupler 22 and shaft collar 24 to the driven shaft 26. The driven shaft 26 is journaled in a pair of spaced shaft centralizers 28 with stainless steel bearings 29. The centralizers 28 define a gas mixing chamber 30. The lower centralizer 28 is perforated by a number of gas delivery holes 32 and a turbine 34 is attached to the end of the driven shaft 26 immediately below the gas delivery holes 32. A gas delivery tube 36 has a lower end attached to the housing 12 in communication with the gas mixing chamber 30, and an upper end attached to the gas intake 38 on the central box 40.

The control box 40 houses an explosion proof electric motor 42 that drives a hydraulic pump 44. The pump 44, with the associated reservoir 46 and pressure and return lines 48 and 49 supplies hydraulic fluid to the motor 14. A power source 50 and gas line 52 are provided to supply power to the electric motor 42 and gas to the mixing chamber 30. It is to be understood that the gas supplied may be atmospheric air or any other treatment gas suitable for treating contaminated groundwater.

The apparatus 10 for delivering gas media to contaminated aquifers is used for degradation/destruction of fugitive contaminants present in the groundwater. Delivery of gas to the aquifer is accomplished by installing the apparatus 10 into environmental industry standard treatment wells installed with drilling rigs, or into treatment cells constituting excavated areas with coarse-grained aggregate used as backfill. The apparatus is unique due to the following characteristics: it uses a variable speed hydraulic motor 14 and possesses variable torque at the turbine 34 of the treatment unit 10. Micro-gas bubbles are produced at a partial vacuum resulting from cavitation created at the bottom of the mixing chamber 30. This cavitation and resulting vacuum causes the treatment gas to be drawn into the mixing chamber 30 for expulsion out of the bottom of the unit into the media to be treated. The submersible treatment unit 10 can be submerged at the users required depth and operated at variable speeds such that seasonal groundwater level variations are not an issue, and depth to the treatment zone is not of issue. Gas/air delivery is accomplished via a specialized gas delivery tube 36 that is extended from the down hole unit up to the ground level where air or other treatment gas enters the tube 36 and is drawn by the vacuum caused by the cavitation at the bottom of the unit 10.

Figure 2:
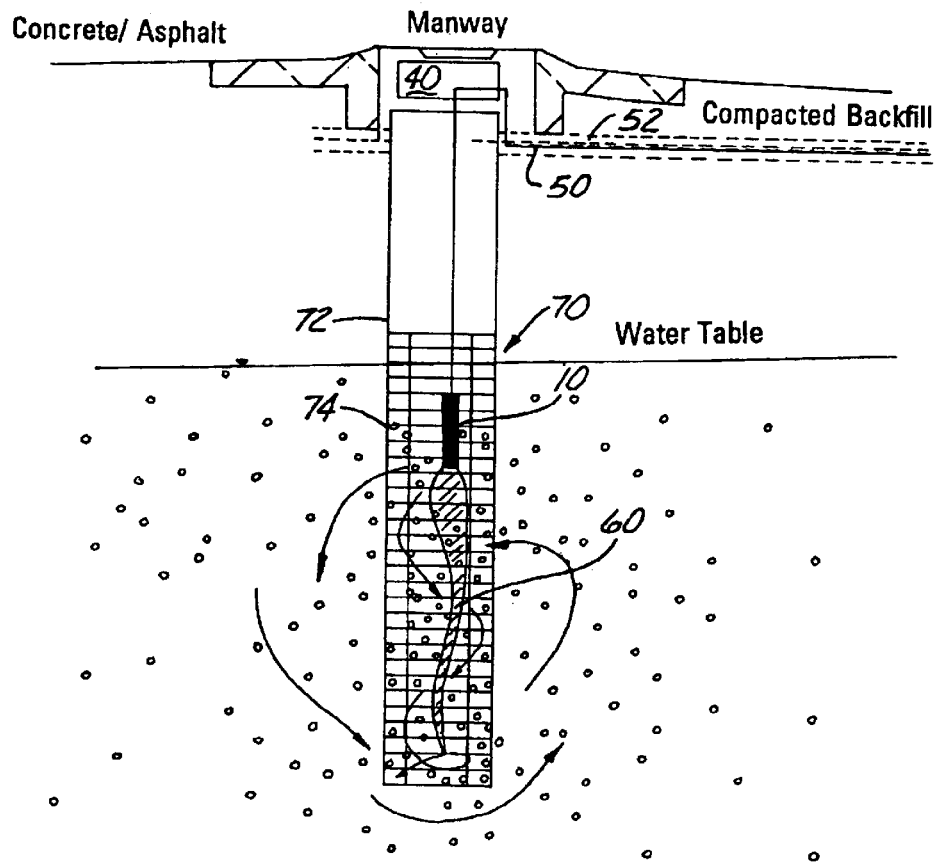
FIG. 2 is a side elevation section view illustrating the creation of a vortex in the contaminated groundwater directly below the apparatus of the present invention.

FIG. 2 illustrates the vortex 60 action created by the unit 10 in the treatment well 70 that allows for a dynamic in-well condition that homogenizes gas enriched groundwater resulting in maximum disbursement and transfer of the dissolved air or treatment gas into the contaminated aquifer. The well 70 includes a riser pipe 72 with a screened interval 74 where the vortex 60 is formed to allow free dispersion of the micro gas bubbles. This is unique to this art when compared to other gas dispersion techniques, where the water column in the treatment well remains in a stagnant condition, or an uneven heterogeneous distribution of the dissolved air/gas in the water column in the treatment well. Down hole equipment incorporates a heavy-duty stainless steel gas mixing chamber 30, twin shaft stabilizers 28 with bearings 29, and a submersible motor 14 constructed of materials suitable for a wide range of contaminant applications.

Figure 3:
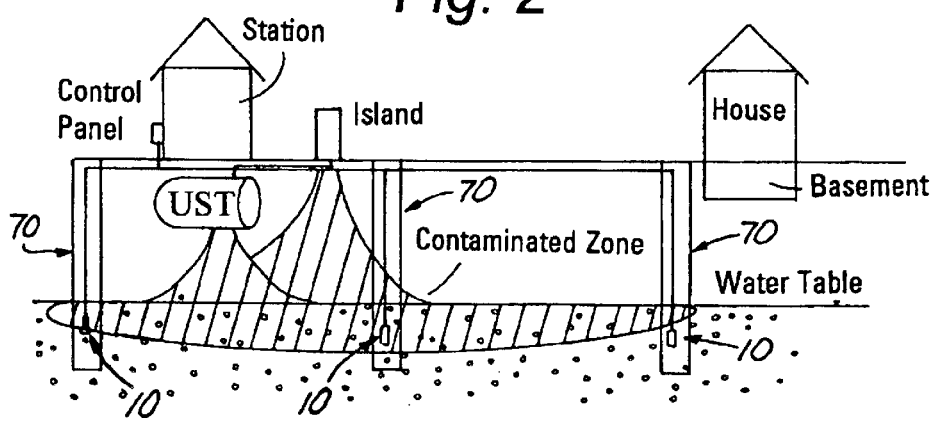
FIG. 3 is a side elevation sectional view showing a typical installation of a series of the three units of the present invention at a contaminated site.

The system can be driven from equipment placed in a building and attached to the systems in series of wells, as shown in FIG. 3 or, it can be installed as single self-contained unit. The system has a water proof control enclosure 40, as well as an explosion proof motor 42, that is installed in the well 70 with a specialized well head completion in a flush to grade manhole. This stand-alone option provides for the elimination of an above grade equipment containment building. The units can be installed in stand-alone wells or in a series of treatment wells/cells at a site.

The system differs from systems that rely on forced or pressurized gas or air. The system does not produce hydraulic mounding, does not push contamination laterally in the aquifer since no pressure is applied to the formation, does not volatilize contaminants creating potentially hazardous vapors to migrate to the vadose zone or into subterranean confined spaces such as basements. Therefore, the process results in significant cost advantages as it does not require a soil vapor extraction (SVE) system, that is required to remove and control potential vapors that are produced from forced or compressed gas injection systems. In addition, the process can be applied to difficult stratigraphy such as fractured bedrock or layered deposits with varying hydraulic conductives without concern for forcing contaminants along preferential migration pathways; i.e., fissures, fractures, low conductive sediments over highly conductive sediments. These types of aquifers are of concern to regulators and to the health and safety of humans when forced or compressed gas is injected to treat contaminated aquifers.

When applied for biological enhancement, indigenous bacteria are stimulated through the introduction of the dissolved gas such that aerobic respiration or anaerobic kinesis proliferates, and contaminants are used as the carbon source for microbial growth. By-products of the biological process include: natural surfactants in cell waste material, water, and carbon dioxide in aerobic contaminant degradation; carbon dioxide and methane or nitrogen or sulfur anion depending on the material degraded under anaerobic conditions; and in co-metabolism; i.e., use of butane gas to treat trichloroethylene where by-products would be carbon dioxide, chloride ions, and cell matter.

The method and apparatus transfers gas into contaminated aquifers to increase dissolved phase gas content resulting in decontamination through biological degradation and/or destruction of contaminants in groundwater and soil in the phreatic zone which is at and below the water table. This method and apparatus overcomes difficulties faced with other remediation techniques.

The system uses partial vacuum and dynamic vortex action for gas transfer removing the need for and concerns with injection of compressed air or treatment gas under pressure or force and the potential for inducing contaminants to migrate through hydraulic mounding, or preferentially through increasing formation pressure causing the undesirable spread of contamination. The system uses subtle gas transfer to prevent the liberation of dissolved and adsorbed phase volatile compounds into the vapor phase that can result in the presence of potentially hazardous vapors that are a threat to confined subterranean spaces. Because of this significant feature, the method and apparatus of the present invention eliminates the need and costs for using a soil vapor extraction system to control such vapors; and significantly reduces the amount of infrastructure since only electrical conduit and wiring is required to each treatment apparatus, resulting in economic advantage. When compared to chemical applications, i.e. oxygen release compounds, oxygen or other gas transfer, the system continues to function regardless of factors such as inadequate contaminant mass definition and subsequent need to continue with additional chemical re-applications when clean-up levels are not achieved. The system allows for the treatment of persistent pockets of untreated contamination that can result from stagnant chemical dispersion of oxygen release compounds, uneven or stratified gas distribution through gas injection as well as channeling or preferential gas migration. The apparatus allows for homogenization and even distribution of dissolved gas through its dynamic vortex flow feature and resulting flux with the aquifer being treated, and allows for application at sites where light non-aqueous phase liquids (LNAPL) exist without concern for vapor liberation or unwanted LNAPL migration because the gas transfer is below atmospheric pressure under a slight partial vacuum.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of treating contaminated groundwater, comprising the steps of:

drawing a treatment gas from a supply source to a discharge point below a water table containing contaminated groundwater;

creating a downwardly directed vortex in the groundwater adjacent to the discharge point within a treatment well including a riser pipe having a screened interval, whereby the treatment gas is drawn into the vortex to form bubbles of treatment gas for dissolution into the groundwater.

2. The method of claim 1 wherein the treatment gas is atomospheric air.

3. The method of claim 1 wherein the treatment gas is butane.

4. The method of claim 1 wherein the treatment gas is ozone.

5. An apparatus for treating contaminated groundwater, comprising:

a housing disposed below a water table containing contaminated groundwater;

a drive motor disposed within the housing;

a turbine driveably attached to the drive motor;

a gas mixing chamber disposed within the housing above the turbine;

a gas delivery tube having a lower end disposed in communication with the gas mixing chamber and an upper end extending up above the water table to a treatment gas supply source; and a gas delivery hole formed in a portion of the gas mixing chamber above the turbine.

6. The apparatus of claim 5 wherein the drive motor is a variable speed hydraulic motor.

7. The apparatus of claim 6 wherein the hydraulic motor is driveably coupled to a hydraulic pump disposed above the water table.

8. A method of treating contaminated groundwater, comprising the steps of:

providing a treatment gas from a supply source for delivery to a discharge point below a water table containing contaminated groundwater;

creating a downwardly directed vortex in the groundwater adjacent to the discharge point, said vortex resulting in cavitation which produces a vacuum, whereby the treatment gas is drawn by said vacuum into the vortex to form bubbles of treatment gas for dissolution into the groundwater.

9. The method of claim 8 wherein the vortex is created within a treatment well.

10. The method of claim 9 wherein the treatment well includes a riser pipe having a screened interval.

11. The method of claim 8 wherein the treatment gas is atomospheric air.

12. The method of claim 8 wherein the treatment gas is butane.

13. The method of claim 8 wherein the treatment gas is ozone.

* * * * *